UNITED STATES PATENT OFFICE.

AUGUSTUS R. MOEN, OF NEW YORK, N. Y.

IMPROVED MODE OF CONSTRUCTING WALLS AND FLOORS OF CELLARS.

Specification forming part of Letters Patent No. 14,323, dated February 26, 1856; Reissue No. 367, dated April 8, 1856.

*To all whom it may concern:*

Be it known that I, A. R. MOEN, of the city, county, and State of New York, have invented a new and useful improvement in the construction of basement, cellar, vault, conduit, and other like walls impervious to water, by which dampness is effectually excluded, and an impervious, dry, and indestructible wall formed with celerity and cheaply, perfectly water-proof and water-tight; and I do hereby declare the following to be a full, clear, and exact description thereof and of its modifications.

Walls have been built in damp places, and for the purpose of holding water, usually with water-cement, which stands the dampness perfectly well, but does not exclude it penetrating through the wall, and is therefore inapplicable to form a dry cellar or basement. To effect this a coat of asphaltum or other analogous material has been laid upon the wall; but it was found impossible to make it stick. Asphaltum and bitumen generally will not adhere to stone or brick that has any moisture in it, and therefore this was abandoned. Walls have been built of perfectly dry material, with asphaltum as a cement; but to this there were two objections: First, it lacked the durability of a hydraulic-cement wall, and, secondly, it is too expensive for common purposes, and too difficult to work. All attempts to unite the two into one perfect homogeneous mass with building materials have failed, so far as my knowledge extends. It is true, cement and other foundations have been laid, and a coat of asphaltum, coal-tar, or other analogous bituminous substance has been spread over it; but they were not united, and if water should get under the exterior coating, with a head to force it, there would at once be a separation between it and the wall or water-cement below, there being no bond of union between them.

My improvement is for the purpose of overcoming all the previously-existing difficulties by binding together in one homogeneous or perfectly united mass the water-cement, (of any kind or description which is mixed with water,) the building material, (brick or stone,) and asphaltum or its equivalent. To effect this I prepare the stones or bricks, or other material suited to the purpose to be used, by drying them thoroughly, and then coating one side of them with asphaltum or other bitumen, which, while they are in that state, firmly adheres to and incorporates itself therewith, so that no after dampness can separate them. This coating can, if thought desirable, be extended down the sides of the stone an inch (more or less) all around. Thus prepared, the stone or bricks can be laid into the wall with hydraulic or other suitable cement or mortar. I prefer, however, hydraulic cement for wet places as the only suitable material. After the wall is laid with the above-coated sides out, they are ready to receive a coat of the melted bitumen, which is made to fill all the interstices between the stones and give a perfect surface over the whole wall, through which no dampness can penetrate. This wall possesses all the permanence and the valuable qualities of a cement or mortar wall, together with the additional invaluable advantages of a perfectly water-proof wall, by the intimate and indissoluble connection of two antagonistic cements—namely, bitumen and hydraulic or other water cement—by means of the stone, brick, or other proper material used in constructing the wall, either above, below, or on the sides. Floors can be constructed in the same manner.

Having thus fully described the characteristics of my invention, what I claim therein as new, and for which I desire to secure Letters Patent, is—

The mode herein described of forming walls and floors by combining into one mass the water-cement and asphaltum or its equivalent by means of the solid building materials, as herein fully set forth, by which the asphaltum or its equivalent is caused perfectly to adhere to the bricks or stone of the wall built with a water-cement, which also adheres to the same stone or brick, as above described.

A. R. MOEN.

Witnesses:

J. J. GREENOUGH,
JOHN WRIGHT.